US010246025B1

(12) United States Patent
Knigge et al.

(10) Patent No.: US 10,246,025 B1
(45) Date of Patent: Apr. 2, 2019

(54) KAYAK LOADING SYSTEM

(71) Applicants: Brenden Arthur Knigge, Seffner, FL (US); Ricardo Francisco Socci, Tampa, FL (US); Matthew Paul Baldwin, Palm Harbor, FL (US); Ivan Wain Williams, Yulee, FL (US)

(72) Inventors: Brenden Arthur Knigge, Seffner, FL (US); Ricardo Francisco Socci, Tampa, FL (US); Matthew Paul Baldwin, Palm Harbor, FL (US); Ivan Wain Williams, Yulee, FL (US)

(73) Assignee: University of South Florida, Tampa, FL (US)

( * ) Notice: Subject to any disclaimer, the term of this patent is extended or adjusted under 35 U.S.C. 154(b) by 44 days.

(21) Appl. No.: 15/197,165

(22) Filed: Jun. 29, 2016

Related U.S. Application Data

(60) Provisional application No. 62/195,043, filed on Jul. 21, 2015.

(51) Int. Cl.
B60R 9/045 (2006.01)
B60R 9/00 (2006.01)
B60R 9/042 (2006.01)
B60R 9/048 (2006.01)
B60R 9/08 (2006.01)
B60P 3/10 (2006.01)

(52) U.S. Cl.
CPC .............. B60R 9/042 (2013.01); B60R 9/048 (2013.01); B60R 9/08 (2013.01); B60P 3/1016 (2013.01)

(58) Field of Classification Search
CPC ........... B60R 9/042; B60R 9/08; B60R 9/048; B60R 9/04

USPC ......... 224/310, 320, 321, 324; 414/462, 546
See application file for complete search history.

(56) References Cited

U.S. PATENT DOCUMENTS

| 4,907,934 | A | | 3/1990 | Holladay | |
|---|---|---|---|---|---|
| 5,297,912 | A | * | 3/1994 | Levi ...................... | B60R 9/0423 414/462 |
| 5,360,150 | A | * | 11/1994 | Praz ........................ | B60R 9/042 224/280 |
| 5,398,778 | A | * | 3/1995 | Sexton .................. | B60R 9/0423 224/310 |
| 5,850,891 | A | * | 12/1998 | Olms .................... | B60R 9/0423 182/127 |
| 5,884,824 | A | | 3/1999 | Spring, Jr. | |
| 6,092,972 | A | * | 7/2000 | Levi ...................... | B60R 9/0423 224/310 |

(Continued)

FOREIGN PATENT DOCUMENTS

CA 2596229 A1 2/2008

Primary Examiner — Nathan J Newhouse
Assistant Examiner — Lester L Vanterpool
(74) Attorney, Agent, or Firm — Nicholas Pfeifer; Smith & Hopen, P. A.

(57) ABSTRACT

A system and method for loading items onto a vehicle. The system allows a support to be easily lowered from, for example, the roof of a vehicle towards the ground. The items to be loaded are secured in the supports at a much lower height than the roof of the vehicle to reduce the possibility of injury and eliminate the need of an additional person for loading and unloading objects onto the roof of a vehicle. Once the item is loaded onto the supports, the system can raise the item onto the roof and secure it in a safe position for transportation.

6 Claims, 10 Drawing Sheets

(56) References Cited

U.S. PATENT DOCUMENTS

| | | | | |
|---|---|---|---|---|
| 6,099,231 A | * | 8/2000 | Levi | B60R 9/0423 |
| | | | | 224/310 |
| 6,158,638 A | * | 12/2000 | Szigeti | B60R 9/042 |
| | | | | 224/310 |
| 6,179,543 B1 | * | 1/2001 | Adame | B60R 9/0423 |
| | | | | 224/310 |
| 6,315,181 B1 | * | 11/2001 | Bradley | B60R 9/0423 |
| | | | | 224/310 |
| 6,360,930 B1 | * | 3/2002 | Flickenger | B60R 9/0423 |
| | | | | 118/314 |
| 6,427,889 B1 | * | 8/2002 | Levi | B60R 9/0423 |
| | | | | 224/310 |
| 6,561,396 B2 | * | 5/2003 | Ketterhagen | B60R 9/042 |
| | | | | 224/310 |
| 6,764,268 B2 | * | 7/2004 | Levi | B60R 9/0423 |
| | | | | 224/310 |
| 7,048,490 B2 | * | 5/2006 | Henderson | B60R 9/042 |
| | | | | 224/310 |
| 7,513,730 B2 | | 4/2009 | Goyanko | |
| 7,549,831 B2 | * | 6/2009 | Hendley | B60R 9/0423 |
| | | | | 224/310 |
| 7,780,050 B2 | * | 8/2010 | Tucker | B60R 9/042 |
| | | | | 224/309 |
| 9,193,304 B2 | * | 11/2015 | Svaldi | B60R 9/06 |
| 9,327,654 B2 | * | 5/2016 | Richter | E06C 5/04 |
| 9,346,409 B2 | * | 5/2016 | Pfaeffli | B60R 9/045 |
| 9,796,340 B2 | * | 10/2017 | Bharucha | B60R 9/0485 |
| 2008/0035688 A1 | * | 2/2008 | Malone | B60R 9/042 |
| | | | | 224/310 |
| 2009/0145940 A1 | * | 6/2009 | Bukowiec | B60R 9/042 |
| | | | | 224/310 |
| 2014/0169918 A1 | * | 6/2014 | Buller | B60R 9/042 |
| | | | | 414/462 |
| 2014/0205419 A1 | | 7/2014 | Svaldi et al. | |

\* cited by examiner

KAYAK LOADING SYSTEM

CROSS-REFERENCE TO RELATED APPLICATIONS

This nonprovisional application is a continuation of and claims priority to provisional application No. 62/195,043, entitled "KAYAK LOADING SYSTEM," filed Jul. 21, 2015 by the same inventor.

BACKGROUND OF THE INVENTION

1. Field of the Invention

This invention relates to an adjustable and efficient system for loading items onto the roof of a vehicle. More specifically, it relates to a system that can easily raise and lower a kayak from the roof of a vehicle to a more manageable loading/unloading height.

2. Brief Description of the Prior Art

While kayaks are easily maneuvered in the water, handling them on land can be quite difficult. The average recreational kayak is between six and twelve feet long, and weighs between forty and eighty pounds. Loading one of these recreational kayaks onto the roof of a motor vehicle can be extremely difficult, especially when the vehicle is tall. Further difficulty arises when an individual attempts to load or unload a kayak without assistance. Such circumstances have an increased risk of injury, especially if the individual is returning from a fatiguing day of kayaking.

Accordingly, what is needed is an adjustable and efficient system for securing and lifting a kayak from a manageable height to the roof of the vehicle. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for an adjustable and efficient system for securing and lifting a kayak from a manageable height to the roof of a vehicle is now met by a new, useful, and nonobvious invention.

The novel structure includes a mounting platform attachable to the roof of the vehicle and a first rotating arm structure secured to the mounting platform. The system preferably includes a second rotating arm structure, but can operate with any number of arm structures. In an embodiment, each rotating arm structure includes a first, second, and third arm member. The proximal end of the first arm member is connected a rotational axle incorporated into at a lateral side of the mounting platform and a distal end is pivotally interconnected with a proximal end of the second arm member. A proximal end of the third arm is pivotally secured to the mounting platform and a distal end of the third arm is pivotally secured to the distal end of the second arm member.

The system further includes a, preferably J-shaped, support slidably secured to the second arm member. The support is adapted to slide along the extent of the second arm member so that the support can extend closer to the ground for loading a kayak or other items onto the support. An embodiment of the J-shaped support includes a width adjusting mechanism to alter a distance of a free end of the J-shaped from the body of the J-shaped support. As a result, the support can act as a clamp to secure the kayak or other items therein.

A motor is in communication with the rotational axle and adapted to rotate the rotational axle. Consequently, a user can easily transition the system between a stored configuration and a loading configuration by controlling the rotation of the axle.

An embodiment includes a plurality of trusses extending between the second arm member in the first rotating arm structure and the second arm member in the second rotating arm structure. The trusses increase the structural support and rigidity of the system at the location in which the most weight is imposed on the system.

An embodiment includes a front rotating arm structure (located towards the front of the vehicle) and a rear rotating arm structure (located near the rear of the vehicle). Both rotating arm structures have a first arm member and a second arm member, where a proximal end of the first arm member is rotationally fixed to the rotational axle and the distal end is rotationally connected to a proximal end of the second arm member. The distal end of the second arm member is connected to the support. A pair of linear guides are rotationally disposed on the mounting platform to guide the second arms as they cantilever over a predetermined loading side of the vehicle when the system transitions into a loading position. The loading position is achieved when the first arms are rotated towards the predetermined loading side of the vehicle such that the distal ends of the first arm members are located near the guides. The movement of the first arm member causes the distal end of the second arm member to cantilever over the predetermined side of the mounting platform placing the support closer to a ground than when the system is in the stored position. The stored position is achieved when the first arm is rotated away from the predetermined loading side of the mounting platform and the distal end of the second arm member and the support are positioned over the roof of the vehicle.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

Figure 1:
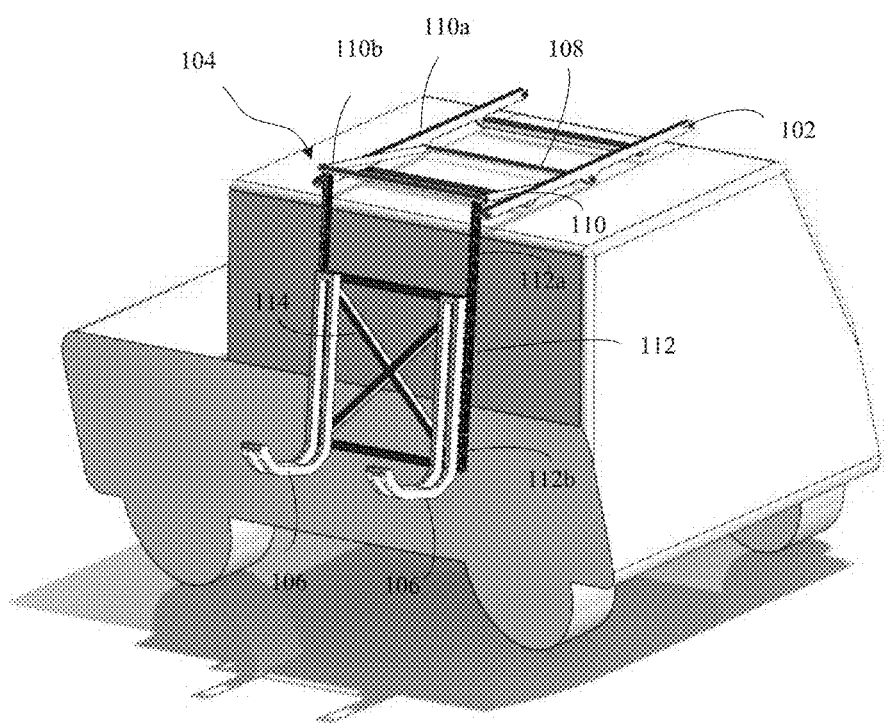
FIG. 1 is a perspective view of an embodiment of the present invention mounted to the roof a vehicle shown in a loading position.

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

The present invention is a loading system, attachable to the roof of a vehicle, that can lower from the roof of the vehicle to allow a user to easily secure and raise a kayak, or other item(s), onto the roof of the vehicle where it is stored for transport. As shown in FIGS. 1-5, an embodiment of the present invention includes mounting platform 102, arm structure 104, and kayak supports 106. Mounting platform 102 preferably mounts to an existing roof rack, but may be secured through conventional means know to a person of ordinary skill in the art. In an embodiment, mounting platform 102 has adjustable mounting locations or an adjustable platform such that it can be mounted to a variety of different roof racks.

Referring to FIGS. 1-4 and 6, an embodiment of mounting platform 102 further includes rotating axle 108. Rotating axle 108 is in communication with rotational motor or mechanism 120, which controls the rotation of axle 108. Rotating axle 108 is rotationally fixed to the one or more arms structures 104 such that arm structures 104 rotate in synchronization with rotating axle 108. As a result, a user can control the location of arm structures 104 by rotating axle 108 using the rotational mechanism. The system may also or separately include a manual hand crank (not shown) in communication with rotating axle 108 to allow a user to manually raise and lower the system between a loading position and stored position. In another embodiment, the system may employ two separate axles, as alternative to a single rotating axle, for altering the location of the arm structures.

In an embodiment, each arm structure 104 includes first arm member 110 having proximal end 110a rotationally fixed to rotating axle 108. Distal end 110b of first arm member 110 is pivotally secured to proximal end 112a of second arm member 112. The pivotal connection between proximal end 112a of second arm member 112 and distal end 110b of first arm member 110 allows the two arm members to rotate with respect to each other in a plane parallel to their respective extents. In an embodiment having two or more arm structures, trusses 114 may extend between second arm members 112 of each arm structure to increase the structural support where kayak 116 is loaded onto kayak supports 106. It should be noted that each embodiment in the provided figures depicts a system employing dual arm structures interconnected via trusses 114. It is considered, however, that the system may use a single arm structure 104 extending between the mounting platform 102 and kayak support(s) 106.

Figure 3:
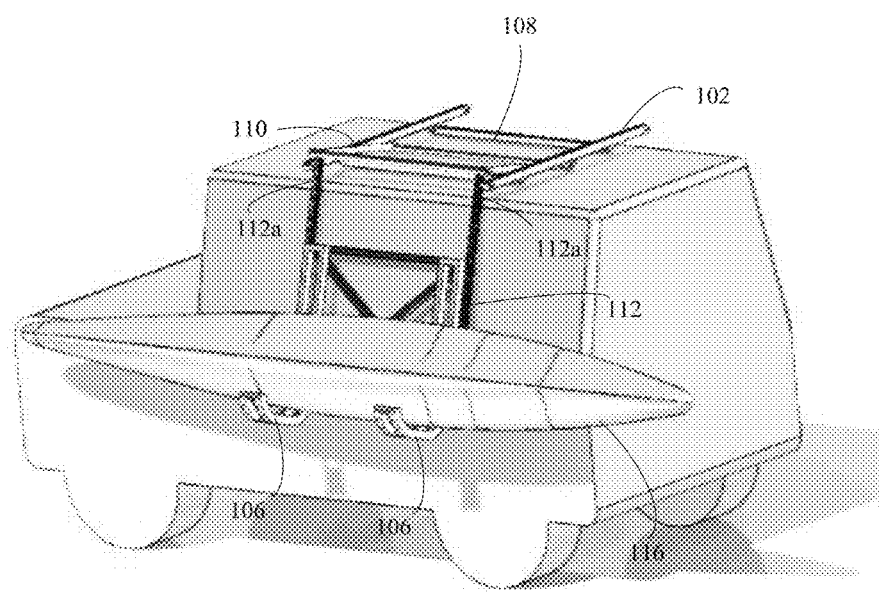
FIG. 3 is a perspective view of an embodiment of the present invention mounted to the roof a vehicle with a kayak loaded on the system while in the loading position.

Referring now to FIG. 3, an arm structure 104 consisting of two arm members 110, 112 includes first arm 110 having an extent generally equal to or greater than the distance between the side of the vehicle and rotating axle 108. As a result, distal end 110b of first arm 110 extends far enough towards the side of the vehicle to allow second arm 112 to hang in a generally vertical position. Thus, kayak supports 106 are at a minimum distance from the ground to reduce difficulty in loading kayak 116 onto kayak supports 106.

Figure 6:
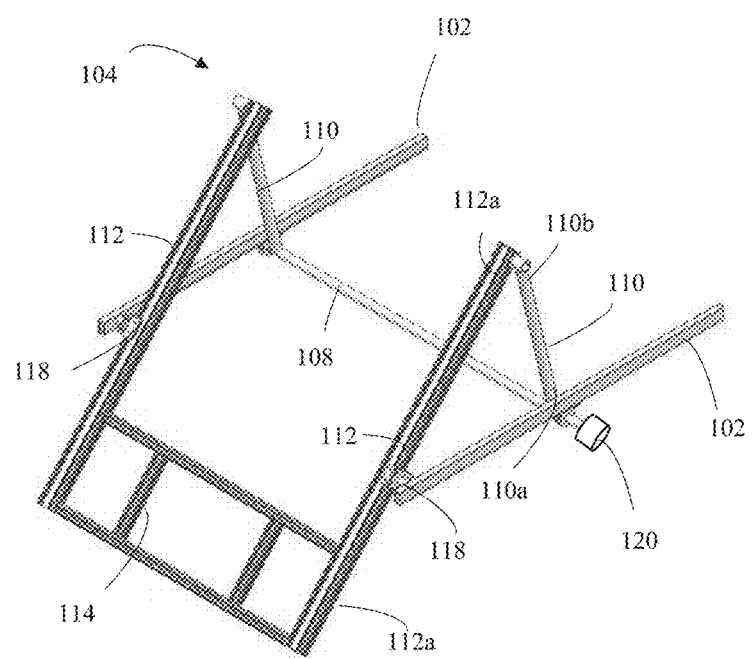
FIG. 6 is a perspective view of an embodiment of the present invention shown in a loading position with the kayak securing members removed.

As best illustrated in FIG. 6, second arm member 112 is slideably engaged with mounting platform 102 on a predetermined loading side of mounting platform 102. As depicted in FIG. 6, second arm members 112 pass through guides 118, which are pivotally connected to mounting platform 102. Guides 118 preferably include linear bearings so that second arm member 112 more easily slide through or along guide 118. In an embodiment, second arms 112 may simply slide along mounting platform 102.

Kayak supports 106 are attached to second arm members 112 and/or trusses 114 extending between the two or more arm structures 104. As most clearly illustrated in FIGS. 3-5, the system may include one or more kayak supports 106 having generally a hook or "J" shape to secure kayak 116 in a valley created at least in part by the shape of kayak support 106. In an embodiment, kayak supports 106 may include one or more straps (not shown) for securing kayak 116 to kayak supports 106. Kayak supports 106 may have any shape such that kayak supports 106 create a valley for receiving the kayak.

In an embodiment, kayak supports 106 may have an adjustable structure, such that kayak supports 106 can alter the size of the valley. These kayak supports 106 are adaptable to handle several different sized kayaks and can also act as a clamp for securing the kayak in the valley as depicted by arrow 109 in FIG. 4410.

Figure 2:
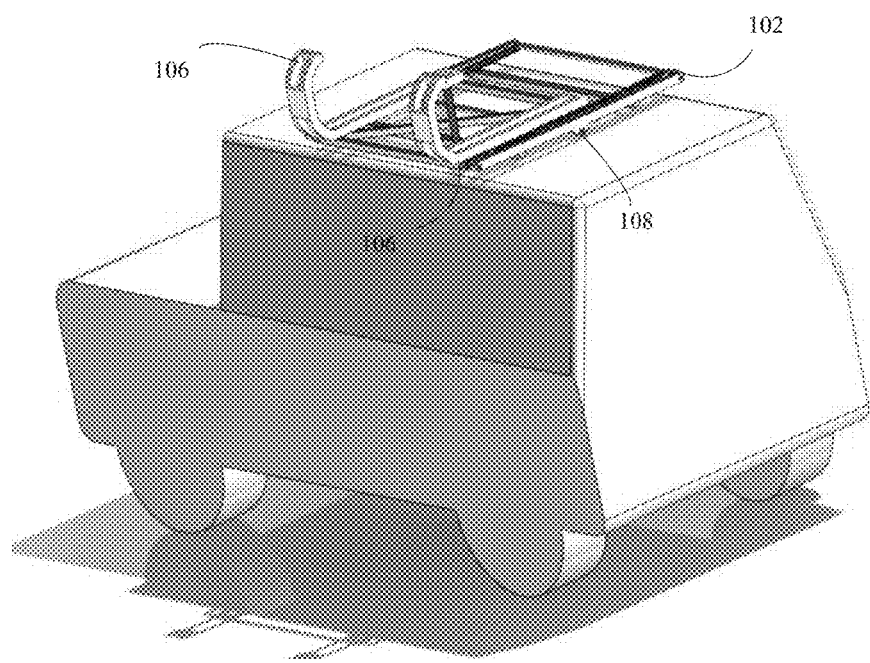
FIG. 2 is a perspective view of an embodiment of the present invention mounted to the roof a vehicle shown in a stored position.
Figure 4:
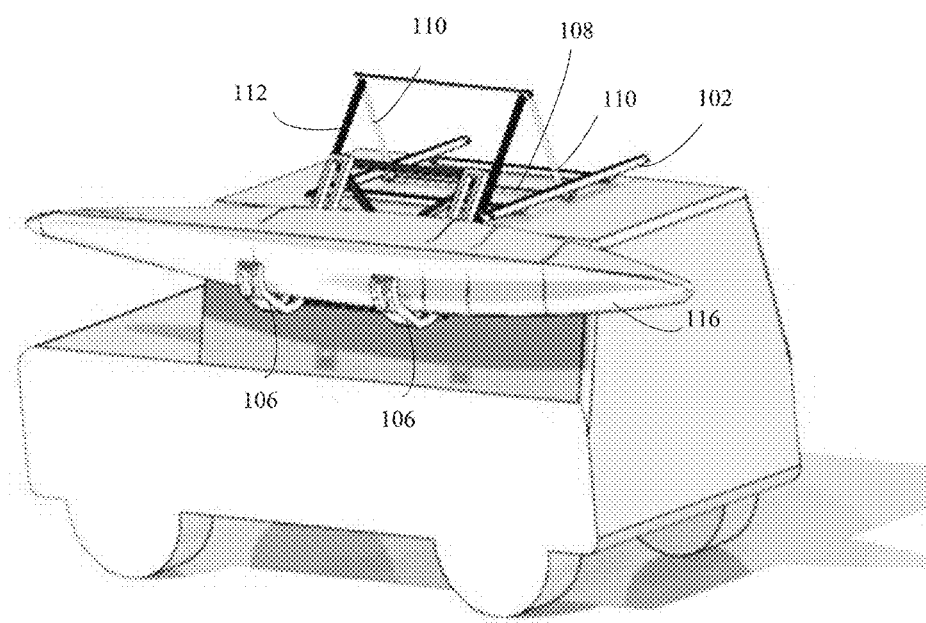
FIG. 4 is a perspective view of an embodiment of the present invention mounted to the roof a vehicle with a kayak loaded on the system while transitioning between the loading position and the stored position.
Figure 5:
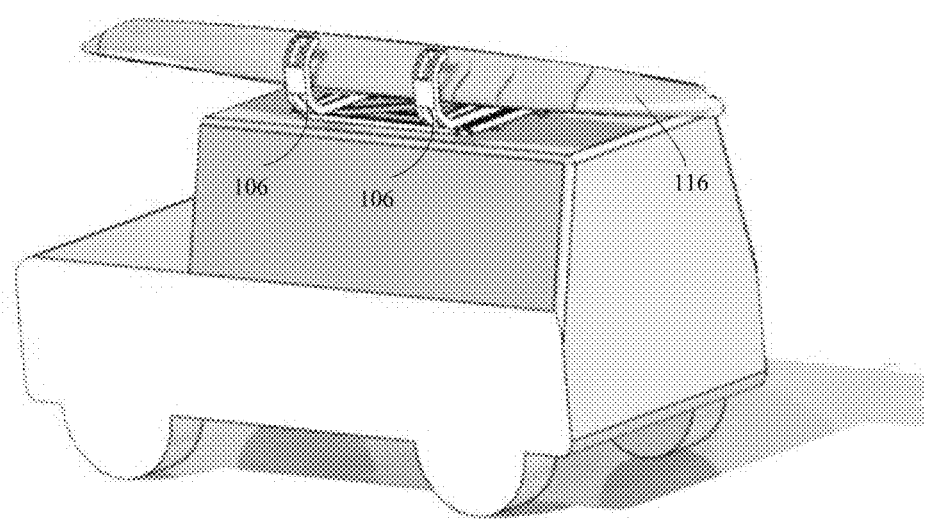
FIG. 5 is a perspective view of an embodiment of the present invention mounted to the roof a vehicle with a kayak loaded on the system while in the stored position.

An important feature of this system is the ability to transition between a loading configuration and a stored configuration. FIGS. 1 and 3 show the system in a loading configuration, while FIGS. 2 and 5 show the system in a stored position. When a system having a port side loading configuration is viewed from the rear of the vehicle, rotating axle 108 is rotated counter-clockwise to transition the system from the stored position to the loading position. The direction of rotation is dependent on whether the system cantilevers over the port side (driver's side) or starboard side (passenger's side) of the vehicle. The system depicted in FIGS. 1-5 is mounted so that second arm 112 cantilevers over the port side of the vehicle when transitioning to the loading position. As first arm member 110 rotates counter-clockwise, distal end 110b of first arm 110 forces proximal end 112a of second arm 112 towards the port side of the vehicle. As proximal end 112a of second arm 112 is forced towards the port side of the vehicle, initially distal end 112b, and in turn the main body, of second arm 112 passes through or along the port side of mounting platform 102 using linear bearings. As shown in FIG. 4, second arm 112 cantilevers over the side of the vehicle and slides down towards the ground as first arm 110 continues to rotates towards the port side of the vehicle.

Transitioning from the loading position back to the stored position is accomplished by reversing the process. First arm 110 is rotated in the clockwise direction, when viewed from the rear of the vehicle, which forces second arm 112 up and away from the ground.

Figure 7:
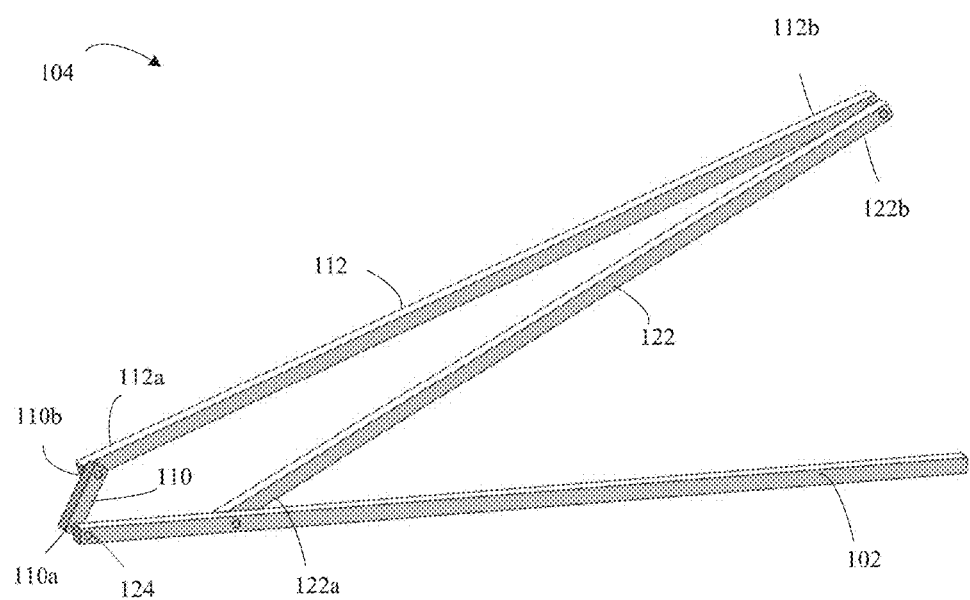
FIG. 7 is a perspective view of an embodiment of the arm structure of the present invention while transitioning between the loading position and the stored position.
Figure 8:
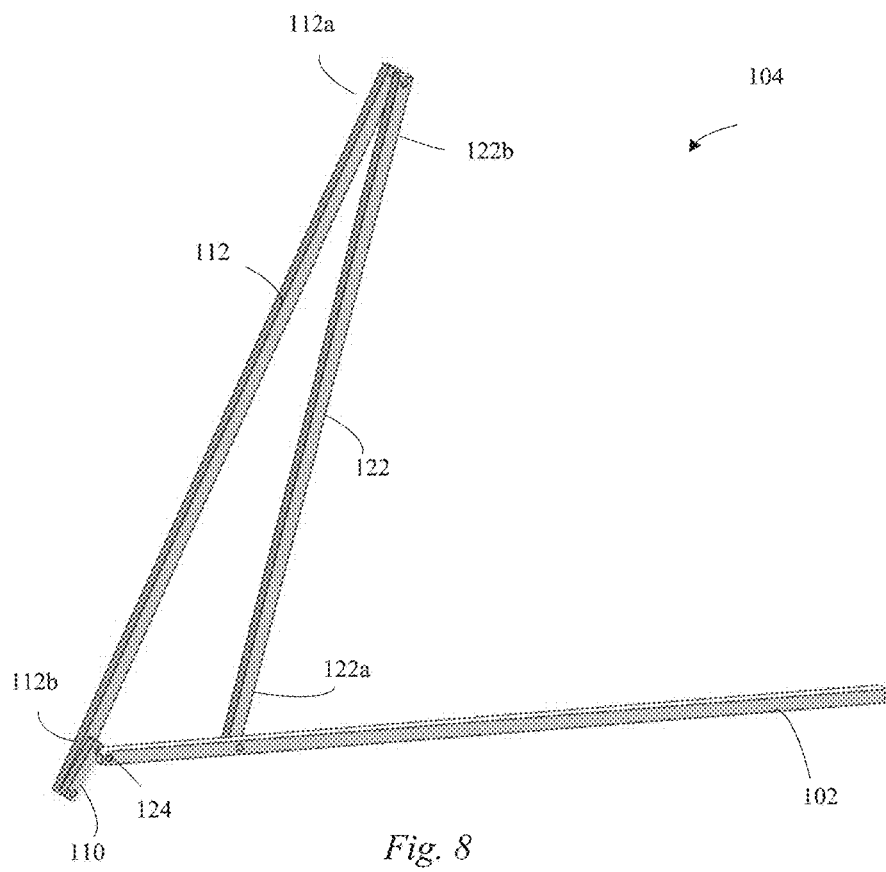
FIG. 8 is a perspective view of an embodiment of the arm structure of the present invention while in the loading position.
Figure 9:
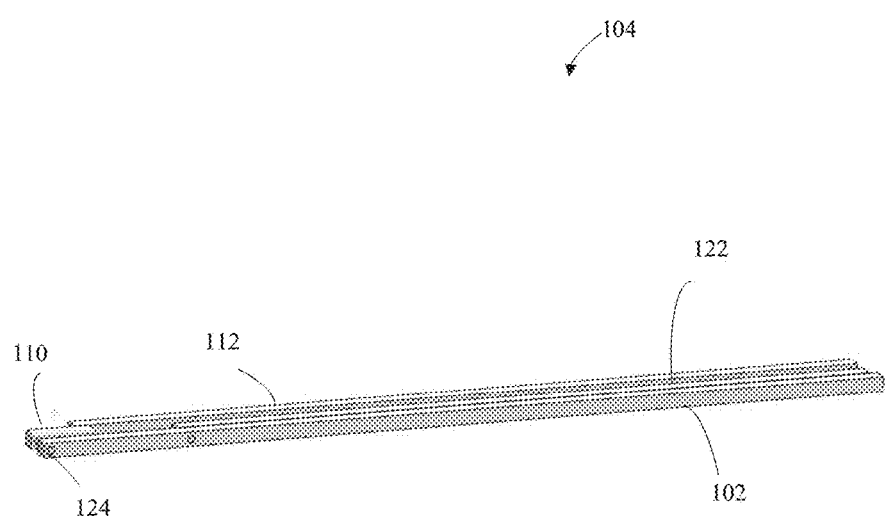
FIG. 9 is a perspective view of an embodiment of the arm structure of the present invention while in the stored position.
Figure 10:
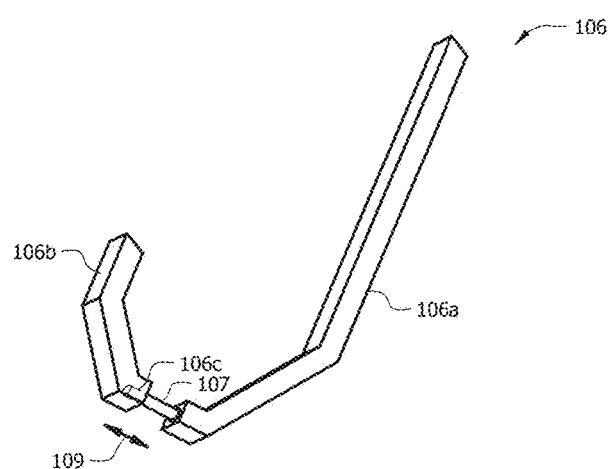
FIG. 10 is a perspective view of an embodiment of the kayak supports adapted to adjust in width.

In an embodiment, as shown in FIGS. 7-9, arm structure 104 may include third arm member 122. Third arm member 122 has proximal end 122a rotationally attached to mounting platform 102 and distal end 122b rotationally attached to distal end 112b of second arm member 112. Both proximal and distal ends 122a, 122b are coupled in a rotationally free manner, such that third arm 122 may rotate in the same general plane, or a plane parallel thereto, as the other arm members 110, 112.

As first arm member 110 is rotated from right to left in a counter-clockwise direction, based on the orientation of the arm structure as shown, second arm 112 is pulled leftwards (or what would be towards the port side of a vehicle if shown). In turn, distal end 112b of second arm 112 is pulled towards the port side of mounting platform 102 and third arm 122 similarly rotates in a counter-clockwise direction. FIG. 7 shows the arm during transition between the loading position, as shown in FIG. 8, and the stored position, as shown in FIG. 9. Rotational mechanism 124 rotates first arm member 110 causing second arm member 112 and third arm member 122 to rotate in the same direction.

The embodiment in FIGS. 7-9 also include a kayak support (not shown). The kayak support is secured to the second arm member, and may include a translation assembly (not shown) allowing the kayak support to extend further towards the ground. The translation assembly may be manually or electronically operated. The translation assembly may telescope from second arm 112 or may slide along second arm 112.

As shown mostly clearly in FIG. 9, first arm member 110 and third arm member 122 have extents that allow the two arm members to align axially when in the stored configuration. As a result, the two arm members are able to lay flat between second arm member 112 and mounting platform 102, while the pulling force from the first arm member remains centrally located between mounting platform 102 and second arm member 112.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be the to fall therebetween.

What is claimed is:

1. A system for loading items onto a roof of a vehicle, comprising:
   a mounting platform adapted to mount to the roof of the vehicle;
   a first rotating arm structure including a first arm member, a second arm member, and a third arm member, wherein the first arm member includes a proximal end connected a rotational axle incorporated into at a lateral side of the mounting platform and a distal end pivotally interconnected with a proximal end of the second arm member;
   a proximal end of the third arm pivotally secured to the mounting platform and a distal end of the third arm pivotally secured to a distal end of the second arm member;
   a J-shaped support slidably secured to the second arm member, thereby allowing the support to slide along an extent of the second arm member resulting in the support extending closer to the ground;
   the J-shaped support having a width adjustment to alter a distance of a free end of the J-shaped support from a body of the J-shaped support in a lateral direction with respect to a longitudinal axis of the body of the J-shaped support; and
   a motor adapted to rotate the rotational axle, thereby allowing a user to transition the system between a stored configuration and a loading configuration by controlling the rotation of the rotational axle.

2. The system of claim 1, further comprising:
   a second rotating arm structure having a first arm member, a second arm member, and a third arm member;
   the first arm member of the second rotating arm structure having a proximal end connected the rotational axle incorporated into at the lateral side of the mounting platform and a distal end pivotally interconnected with a proximal end of the second arm member of the second rotating arm structure; and
   the third arm member of the second rotating arm structure having a proximal end pivotally secured to the mounting platform and a distal end pivotally secured to the distal end of the second arm member of the second rotating arm structure.

3. The system of claim 2, further comprising a plurality of trusses extending between the second arm member in the first rotating arm structure and the second arm member in the second rotating arm structure.

4. A system for loading items onto a roof of a vehicle, comprising:

a mounting platform adapted to mount to the roof of the vehicle;

a front rotating arm structure having a first arm member and a second arm member, the first arm member having a distal end and a proximal end, wherein the proximal end is rotationally fixed to a rotational axle, such that the first arm rotates in synchronization with the rotational axle and the distal end is rotationally connected to a proximal end of the second arm member;

a rear rotating arm structure spaced from the front arm structure in a direction along the longitudinal axis of the vehicle, wherein the rear arm structure includes a first arm member and a second arm member, the first arm member having a distal end and a proximal end, wherein the proximal end is rotationally fixed to the rotational axle, such that the first arm rotates in synchronization with the rotational axle and the distal end is connected to a support having a shape creating a valley to receive the item to be stored on the vehicle;

the support being J-shaped and having a width adjustment to alter a distance of a free end of the J-shaped support from a body of the J-shaped support in a lateral direction with respect to a longitudinal axis of the body of the J-shaped support;

a motor in communication with the rotational axle to rotate the first arm members of the front and rear rotating arm structures;

a pair of linear guides rotationally disposed on the mounting platform to guide the second arms as they cantilever over a predetermined loading side of the vehicle;

a loading position and a stored position, wherein the loading position is achieved when the first arms are rotated towards the predetermined loading side of the vehicle such that the distal ends of the first arm members are located near the guides and the distal end of the second arm member is cantilevered over the predetermined side of the mounting platform with the support closer to a ground than when the system is in the stored position;

the stored position is achieved when the first arm is rotated away from the predetermined loading side of the mounting platform and the distal end of the second arm member and the support are positioned over the roof of the vehicle; and the stored position further including the first and second arm structures laterally offset from each other and the first arm structure and the second arm structure both lying flat in the same lateral plane.

5. The system of claim 4, wherein the first arm members have a longitudinal extent equal to a distance spanning between a lateral side of the mounting platform and the rotational axle.

6. The system of claim 4, further comprising a plurality of trusses extending between the second arm member in the front rotating arm structure and the second arm member in the rear rotating arm structure.

\* \* \* \* \*